US 12,176,000 B2

United States Patent
Ryan et al.

(10) Patent No.: US 12,176,000 B2
(45) Date of Patent: Dec. 24, 2024

(54) DATA STORAGE LIBRARY MAGNETIC DISK RETAIN AND EXCHANGE SYSTEM

(71) Applicant: Western Digital Technologies, Inc., San Jose, CA (US)

(72) Inventors: Robert P. Ryan, Mission Viejo, CA (US); James N. Malina, Irvine, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 18/222,964

(22) Filed: Jul. 17, 2023

(65) Prior Publication Data

US 2024/0221786 A1 Jul. 4, 2024

Related U.S. Application Data (60) Provisional application No. 63/436,819, filed on Jan. 3, 2023.

(51) Int. Cl.
*G11B 17/028* (2006.01)
*G11B 17/05* (2006.01)
*G11B 19/20* (2006.01)

(52) U.S. Cl.
CPC ........ *G11B 17/028* (2013.01); *G11B 17/0282* (2013.01); *G11B 17/05* (2013.01); *G11B 19/2045* (2013.01)

(58) Field of Classification Search
None
See application file for complete search history.

(56) References Cited

U.S. PATENT DOCUMENTS

| 4,509,157 A | * | 4/1985 | Morinaga | G11B 17/032 720/657 |
| 4,570,194 A | | 2/1986 | Schatteman | |

(Continued)

FOREIGN PATENT DOCUMENTS

| CN | 212497739 U | 2/2021 |
| JP | 2010102782 A | 5/2010 |

OTHER PUBLICATIONS

Sony Electronics Inc., Meet the family, 2 pages, downloaded from https://pro.sony/ue_US/products/optical-disc, as early as Aug. 5, 2021.

(Continued)

*Primary Examiner* — Craig A. Renner
(74) *Attorney, Agent, or Firm* — John D. Henkhaus (57) ABSTRACT

A disk media retaining and exchange system configured to accept a disk media assembly including a disk and a ferromagnetic material coupled therewith, includes a spindle motor assembly with a spindle motor and a permanent magnet retainer coupled therewith, whereby the system is configured to retain the disk on the spindle motor by a magnetic force between the ferromagnetic material of the disk media assembly and the permanent magnet retainer of the spindle motor assembly. An electromagnet disk exchange tool may be employed, configured such that energization of coils in close proximity to the disk media assembly overcomes the magnetic force to release the disk media assembly from retention with the spindle motor assembly, and generates another magnetic force between the ferromagnetic material of the disk media assembly and at least one electromagnet of the exchange tool to remove the disk away from the spindle motor for disk exchange.

17 Claims, 9 Drawing Sheets

(56) References Cited

U.S. PATENT DOCUMENTS

| | | | |
|---|---|---|---|
| 4,831,474 A * | 5/1989 | Kumagai | G11B 17/0282 360/99.05 |
| 4,845,578 A * | 7/1989 | Kumagai | G11B 17/0282 360/99.05 |
| 4,853,924 A | 8/1989 | Takahashi et al. | |
| 5,128,818 A * | 7/1992 | Koizumi et al. | G11B 17/0282 360/99.12 |
| 5,291,001 A | 3/1994 | Krayer et al. | |
| 5,457,676 A * | 10/1995 | Park | G11B 17/0282 360/99.12 |
| 5,485,436 A | 1/1996 | Forget et al. | |
| 6,222,818 B1 * | 4/2001 | Kobayashi et al. | G11B 17/03 720/707 |
| 6,807,028 B1 * | 10/2004 | Oishi | G11B 17/0282 360/135 |
| 7,027,385 B1 * | 4/2006 | Shimazaki et al. | G11B 19/2009 369/281 |
| 7,904,918 B2 | 3/2011 | Saji et al. | |
| 8,553,518 B1 | 10/2013 | Ekhoff | |
| 11,443,775 B1 | 9/2022 | Herdendorf et al. | |
| 2001/0030929 A1 * | 10/2001 | Sato et al. | G11B 17/0282 720/704 |
| 2002/0113503 A1 * | 8/2002 | Nagatsuka | G11B 19/2009 310/67 R |
| 2003/0107983 A1 | 6/2003 | Kim et al. | |
| 2004/0022172 A1 * | 2/2004 | Obata et al. | G11B 23/0307 360/133 |
| 2005/0160441 A1 * | 7/2005 | Aoki | G11B 17/0282 720/710 |
| 2006/0190956 A1 * | 8/2006 | Van Der Aa et al. | G11B 17/0282 720/718 |

OTHER PUBLICATIONS

Sony Electronics Inc., PetaSite Scalable Solutions, 5 pages, downloaded from https://pro.sony/ue_US/products/optical-disc/petasite-solutions, as early as Aug. 5, 2021.

Korean Intellectual Property Office (ISA/KR), PCT International Search Report and Written Opinion for International application No. PCT/US2022/028224, Sep. 23, 2022, 10 pages.

\* cited by examiner

INSTALL A DISK MEDIA ASSEMBLY, COMPRISING A DISK MEDIUM AND A FERROMAGNETIC MATERIAL COUPLED WITH A CENTER-HOLE OF THE DISK MEDIUM, ONTO A SPINDLE MOTOR ASSEMBLY, COMPRISING A SPINDLE MOTOR INCLUDING A FLANGE CONFIGURED TO SUPPORT A DISK MEDIUM AND A PERMANENT MAGNET RETAINER COUPLED WITH THE SPINDLE MOTOR, BY:

APPLY CURRENT IN A FIRST DIRECTION TO A FIRST ELECTROMAGNET OF A DISK EXCHANGE TOOL HOLDING THE DISK MEDIA ASSEMBLY TO ROTATE THE SPINDLE MOTOR ASSEMBLY TO MAGNETICALLY ALIGN THE FERROMAGNETIC MATERIAL OF THE DISK MEDIA ASSEMBLY WITH THE PERMANENT MAGNET RETAINER OF THE SPINDLE MOTOR ASSEMBLY
702

REMOVE THE CURRENT TO THE FIRST ELECTROMAGNET OF THE DISK EXCHANGE TOOL TO ENABLE A FIRST MAJOR FLUX PATH BETWEEN THE PERMANENT MAGNET RETAINER OF THE SPINDLE MOTOR ASSEMBLY AND THE FERROMAGNETIC MATERIAL OF THE DISK MEDIA ASSEMBLY, THEREBY RETAINING THE DISK MEDIA ASSEMBLY ON THE SPINDLE MOTOR ASSEMBLY VIA AN ATTRACTIVE MAGNETIC FORCE CORRESPONDING TO THE FIRST MAJOR FLUX PATH
704

REMOVE THE DISK EXCHANGE TOOL FROM PROXIMITY WITH THE SPINDLE MOTOR ASSEMBLY AND DISK MEDIA ASSEMBLY
706

FIG. 7A

REMOVE THE DISK MEDIA ASSEMBLY FROM THE SPINDLE MOTOR ASSEMBLY BY:

APPLY CURRENT IN THE FIRST DIRECTION TO THE FIRST ELECTROMAGNET OF THE DISK EXCHANGE TOOL TO ROTATE THE SPINDLE MOTOR ASSEMBLY TO MAGNETICALLY ALIGN THE FERROMAGNETIC MATERIAL OF THE DISK MEDIA ASSEMBLY WITH THE FIRST ELECTROMAGNET OF THE DISK EXCHANGE TOOL
708

APPLY A CURRENT IN A SECOND DIRECTION TO THE FIRST ELECTROMAGNETIC TO CANCEL THE ATTRACTIVE MAGNETIC FORCE CORRESPONDING TO THE FIRST MAJOR FLUX PATH BETWEEN THE PERMANENT MAGNET RETAINER OF THE SPINDLE MOTOR ASSEMBLY AND THE FERROMAGNETIC MATERIAL OF THE DISK MEDIA ASSEMBLY
710

APPLY A CURRENT TO A SECOND ELECTROMAGNET OF THE DISK EXCHANGE TOOL TO GENERATE A SECOND MAJOR FLUX PATH BETWEEN THE SECOND ELECTROMAGNET AND THE FERROMAGNETIC MATERIAL OF THE DISK MEDIA ASSEMBLY, THEREBY RETAINING THE DISK MEDIA ASSEMBLY ON THE DISK EXCHANGE TOOL VIA AN ATTRACTIVE MAGNETIC FORCE CORRESPONDING TO THE SECOND MAJOR FLUX PATH
712

REMOVE THE DISK EXCHANGE TOOL AND RETAINED DISK MEDIA ASSEMBLY FROM PROXIMITY WITH THE SPINDLE MOTOR ASSEMBLY
714

FIG. 7B

DATA STORAGE LIBRARY MAGNETIC DISK RETAIN AND EXCHANGE SYSTEM

FIELD OF EMBODIMENTS

Embodiments of the invention may relate generally to data storage and particularly to a magnetic disk retaining and exchanging system for an archival data storage library.

BACKGROUND

A hard disk drive (HDD) is a non-volatile storage device that is housed in a protective enclosure and stores digitally encoded data on one or more circular disks having magnetic surfaces. When an HDD is in operation, each magnetic-recording disk is rapidly rotated by a spindle system. Data is read from and written to a magnetic-recording disk using a read-write head (or "transducer") that is positioned over a specific location of a disk by an actuator. A read-write head makes use of magnetic fields to write data to and read data from the surface of a magnetic-recording disk. A write head works by using the current flowing through its coil to produce a magnetic field. Electrical pulses are sent to the write head, with different patterns of positive and negative currents. The current in the coil of the write head produces a localized magnetic field across the gap between the head and the magnetic disk, which in turn magnetizes a small area on the recording medium.

There is an increasing need for archival data storage. Magnetic tape is a traditional solution for data back-up, but is notably slow in accessing the stored data. Current archives are increasingly "active" archives, meaning some level of continuing random read data access is required. In terms of magnetic media cost, magnetic disks in HDDs have the lowest demonstrated cost per terabyte (e.g., $/Tb). Furthermore, magnetic disks are known to have a relatively lengthy useful life, especially when maintained in a controlled environment, whereby the magnetic bits on the media will remain stable for a relatively long time.

Any approaches that may be described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

Embodiments are illustrated by way of example, and not by way of limitation, in the figures of the accompanying drawings and in which like reference numerals refer to similar elements and in which.

DETAILED DESCRIPTION

Generally, approaches to a magnetic disk retaining and exchanging system for a read-write device configured for use in a data storage library are described. In the following description, for the purposes of explanation, numerous specific details are set forth in order to provide a thorough understanding of the embodiments of the invention described herein. It will be apparent, however, that the embodiments of the invention described herein may be practiced without these specific details. In other instances, well-known structures and devices may be shown in block diagram form in order to avoid unnecessarily obscuring the embodiments of the invention described herein.

Introduction

Terminology

References herein to "an embodiment", "one embodiment", and the like, are intended to mean that the particular feature, structure, or characteristic being described is included in at least one embodiment of the invention. However, instances of such phrases do not necessarily all refer to the same embodiment, The term "substantially" will be understood to describe a feature that is largely or nearly structured, configured, dimensioned, etc., but with which manufacturing tolerances and the like may in practice result in a situation in which the structure, configuration, dimension, etc. is not always or necessarily precisely as stated. For example, describing a structure as "substantially vertical" would assign that term its plain meaning, such that the sidewall is vertical for all practical purposes but may not be precisely at 90 degrees throughout.

While terms such as "optimal", "optimize", "minimal", "minimize", "maximal", "maximize", and the like may not have certain values associated therewith, if such terms are used herein the intent is that one of ordinary skill in the art would understand such terms to include affecting a value, parameter, metric, and the like in a beneficial direction consistent with the totality of this disclosure. For example, describing a value of something as "minimal" does not require that the value actually be equal to some theoretical minimum (e.g., zero), but should be understood in a practical sense in that a corresponding goal would be to move the value in a beneficial direction toward a theoretical minimum.

Context

Recall that there is a significant need for archival data storage, and that magnetic disks in hard disk drives (HDDs)

have some advantages over other magnetic media in the context of archival (or "cold") data storage. With respect to reducing the overall cost per byte ($/Tb) of magnetic disk-based storage systems, the costs associated with the read-write head, the mechanical structures, and the electronics might be reduced. Also, increasing the number of disks per system is another way in which to further the $/Tb cost reduction goal. Therefore, a vast magnetic disk "library" containing a significantly large number of magnetic recording disks where individual disks are transported into read-write devices is considered an ultimate low-cost solution to the challenges associated with archival data storage both now and into the future, and one which could demonstrate a faster "time to first byte" than tape (e.g., no tape winding needed) and a faster data rate than with optical disks.

Magnetic Disk Retain and Exchange System

Figure 2:
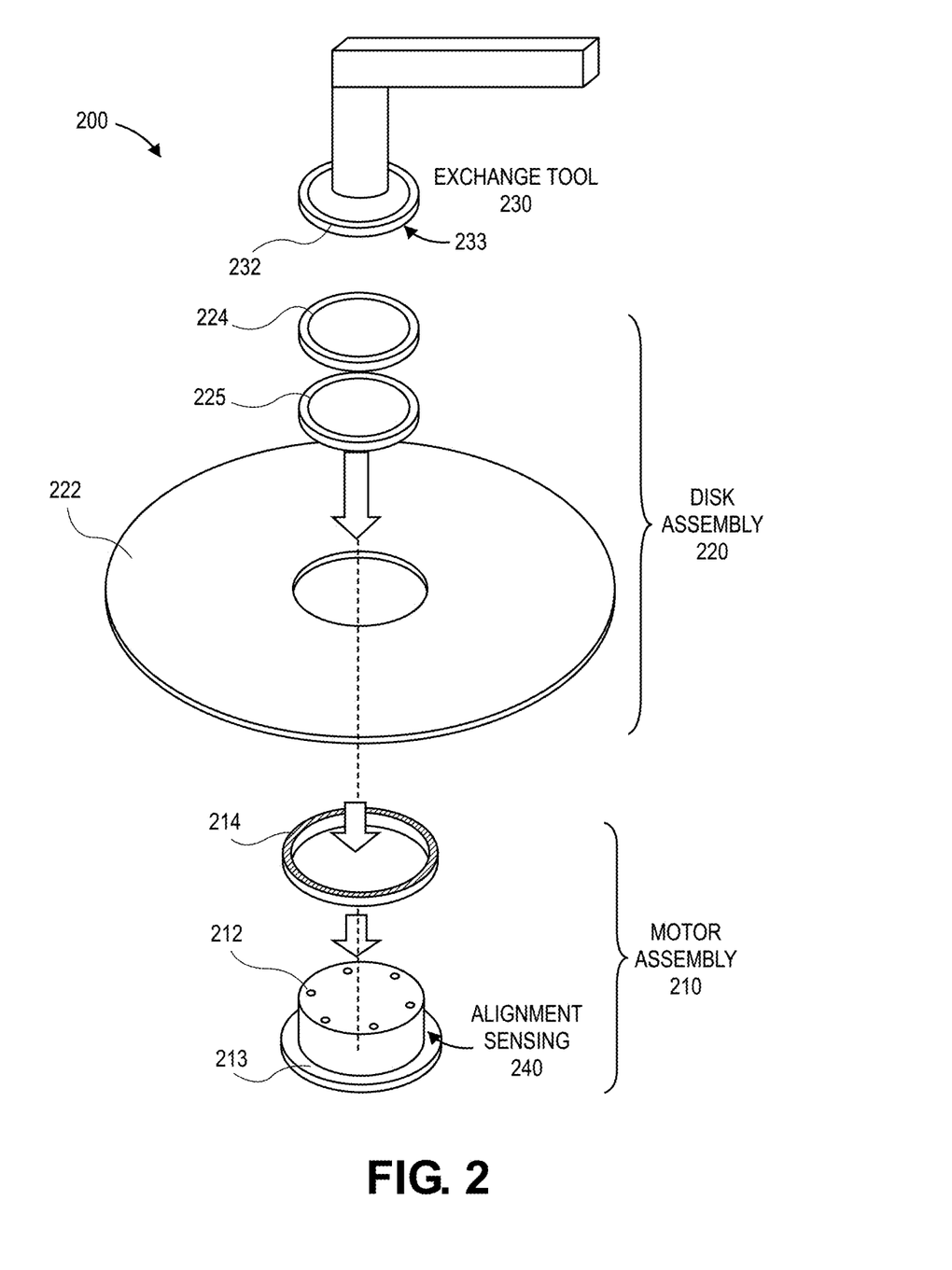
FIG. 2 is an exploded view illustrating a magnetic disk retain and exchange system, according to an embodiment.

FIG. 2 is an exploded view illustrating a magnetic disk retain and exchange system, according to an embodiment. Magnetic disk retain and exchange system 200 ("disk system 200") comprises a spindle motor assembly 210 and a disk assembly 220 and, according to an embodiment, utilizes a disk exchange tool 230 for installing and removing disk assembly 220 from spindle motor assembly 210. The system 200 may be part of a magnetic disk library in which individual disks are transported from storage and mounted for read/write access and then dismounted for return to storage.

Spindle motor assembly 210 ("motor assembly 210") comprises a spindle motor 212 including a flange 213 configured to support a disk medium, and a permanent magnet retainer 214 ("retainer 214") coupled with the spindle motor 212. The configuration of the permanent magnet retainer 214 may vary from implementation to implementation. For one non-limiting example, retainer 214 may be annular in form and coupled with, positioned on flange 213, such as illustrated in and described in more detail in reference to FIG. 3. For another non-limiting example, retainer 214 may be integrated directly into the flange 213 or rotor of spindle motor 212. In any case, according to an embodiment the permanent magnet retainer 214 comprises a plurality of permanent magnets positioned annularly (e.g., in a ring form or configuration) with alternating non-magnetic areas, such as illustrated in and described in more detail in reference to FIG. 5A.

Figure 3:
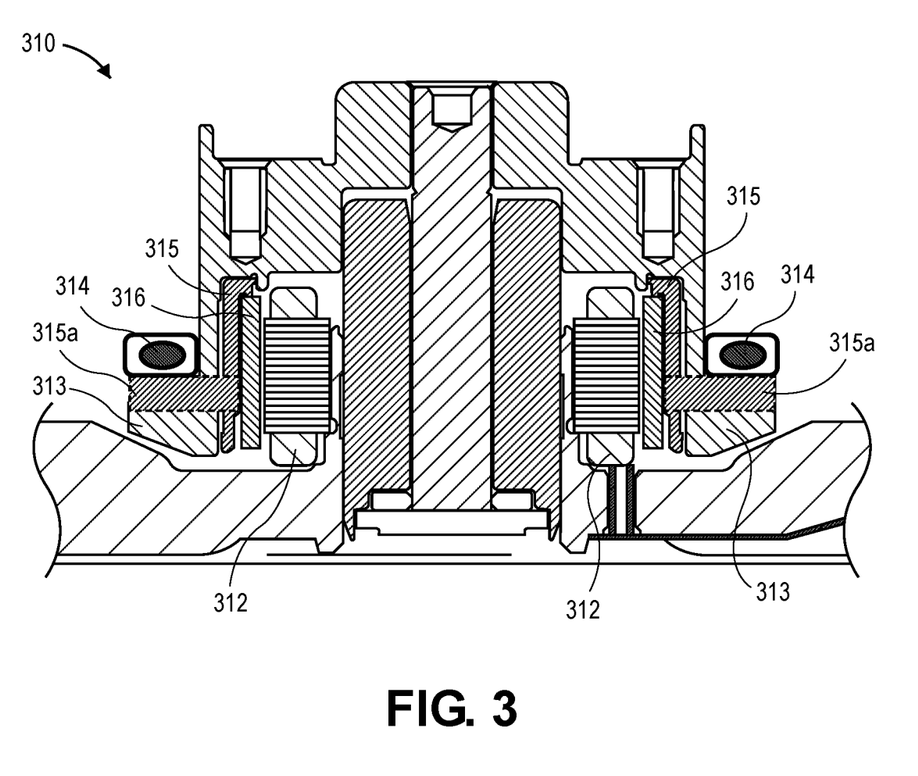
FIG. 3 is a cross-sectional side view illustrating an example spindle motor having a magnetic disk retainer, according to an embodiment.

FIG. 3 is a cross-sectional side view illustrating an example spindle motor having a magnetic disk retainer, according to an embodiment. As with motor assembly 210 (FIG. 2), spindle motor assembly 310 ("motor assembly 310") comprises a spindle motor 312 including a flange 313 configured to support a disk medium, and a permanent magnet retainer 314 ("retainer 314") coupled with the spindle motor 312. According to an embodiment, retainer 314 may be augmented by spindle motor back iron 315 (usually a carbon-steel cylinder around the magnets that forms the return path of flux between adjacent magnets within a rotor), at least in part embedding the functionality of retainer 314 within the spindle motor assembly 310 by coupling the typical brushless DC spindle motor magnets 316 to the clamping surface of retainer 314 through a ferromagnetic path thus forming a dual purpose for the spindle motor magnets, thereby enabling lower cost and improved retaining strength. Stated otherwise, one or more areas of the spindle motor assembly 310 back iron 315 may be modified or augmented to include extending disk mount portion(s) 315a, configured coincident with the permanent magnet poles 216 of retainer 214 (see, e.g., FIG. 5A), 314 to further steer the flux path through the disk media assembly 220 (FIG. 2) by bringing the tips of the "horseshoe" magnets of the retainer 214, 314 to the surface of the retainer 214, 314. Here too retainer 314 comprises a plurality of permanent magnets alternating with non-magnetic areas positioned annularly around the spindle motor 312, providing the retaining/attachment magnetic force between the ferromagnetic material 224 (FIG. 2) of the disk media assembly 220 (FIG. 2) and the spindle motor assembly 310 to retain the disk media assembly 220 on the motor flange 313. Nevertheless, this retaining magnetic force can be cancelled with the disk exchange tool 230 (FIG. 2) to remove the disk media assembly 220 from the motor assembly 210. Note that while retainer 314 is depicted here on top of the disk mount portion(s) 315a of back iron 315, in a configuration in which the back iron 315 is not so modified, the retainer 314 would preferably be positioned directly on top of flange 313.

Returning to FIG. 2, disk media assembly 220 ("disk assembly 220") comprises a disk medium 222, and a ferromagnetic material 224 coupled with a center-hole of the disk medium 222. The configuration of the ferromagnetic material 224 may vary from implementation to implementation. For one non-limiting example, ferromagnetic material 224 may be configured similarly to as depicted in FIG. 2, such as embedded within or coupled to a sleeve 225 (e.g., a plastic sleeve housing) inserted into the center-hole of disk medium 222. In another embodiment, the ferromagnetic material 224 may be made as part of the disk medium. In any case, according to an embodiment the ferromagnetic material 224 comprises a plurality of positions of ferromagnetic material positioned annularly within the disk medium 222 center-hole. According to an embodiment and as illustrated in and described in more detail in reference to FIG. 5B, the ferromagnetic material 224 comprising the plurality of annular positions of ferromagnetic material comprises alternating "clamp path" positions and "pickup path" positions which, in operation, coordinate with electromagnetic coils of the disk exchange tool 230 as described in more detail elsewhere herein. Disk system 200 functions as a removable recording disk retaining mechanism to "clamp" (a term typically used with conventional hard disk drives), retain, hold the disk medium 222 onto the spindle motor 212, where the disk medium 222 is retained on the flange 213 of the motor assembly 210 by an attractive magnetic force ("first attractive magnetic force") between the ferromagnetic material 224 of the disk assembly 220 and the permanent magnet retainer 214 of the motor assembly 210.

According to an embodiment, disk system 200 utilizes a disk exchange tool 230 ("exchange tool 230") for installing and removing disk assembly 220 from motor assembly 210, where the exchange tool 230 comprises at least one electromagnet 232. According to an embodiment the exchange tool 230 comprises a plurality of discrete electromagnet coils positioned annularly, i.e., around an annular housing, such as illustrated in and described in more detail in reference to FIG. 5C. Notably, exchange tool 230 is configured such that energization of electromagnet coil(s) 233 (see, e.g., coils 233 of FIG. 5C) in close proximity to the disk assembly 220 overcomes the first attractive magnetic force, i.e., between the ferromagnetic material 224 of the disk assembly 220 and the permanent magnet retainer 214 of the motor assembly 210, to release the disk assembly 220 from retention with the motor assembly 210 and generates an attractive magnetic force ("second attractive magnetic force") between the ferromagnetic material 224 of the disk assembly 220 and at least one of the electromagnet 232 of the exchange tool 230 to remove the disk assembly 220 from the motor assembly 210.

Figure 4A:
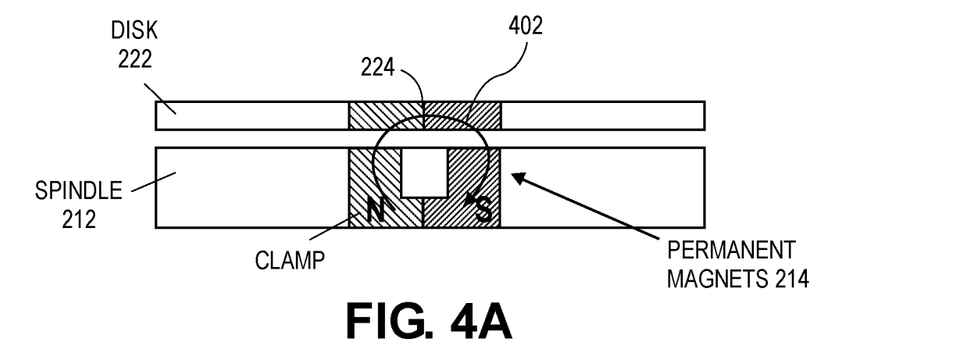
FIGS. 4A-4C are side view diagrams illustrating a disk exchange procedure, according to an embodiment.
Figure 4B:
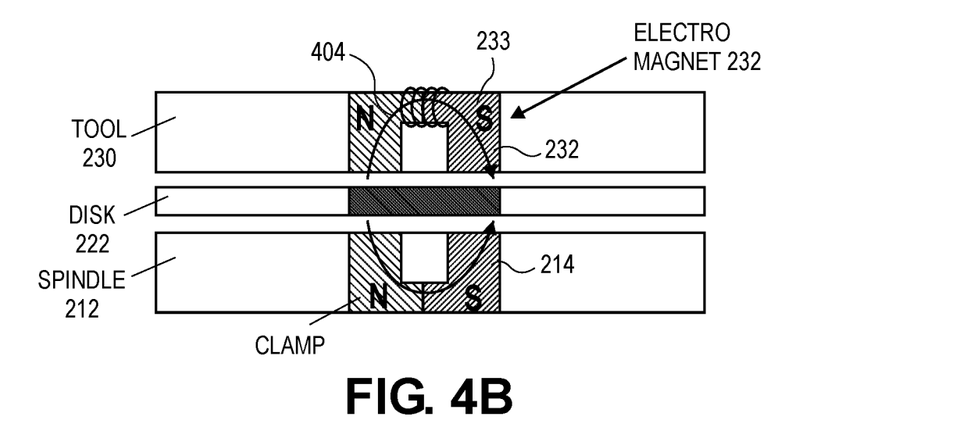
Figure 4C:
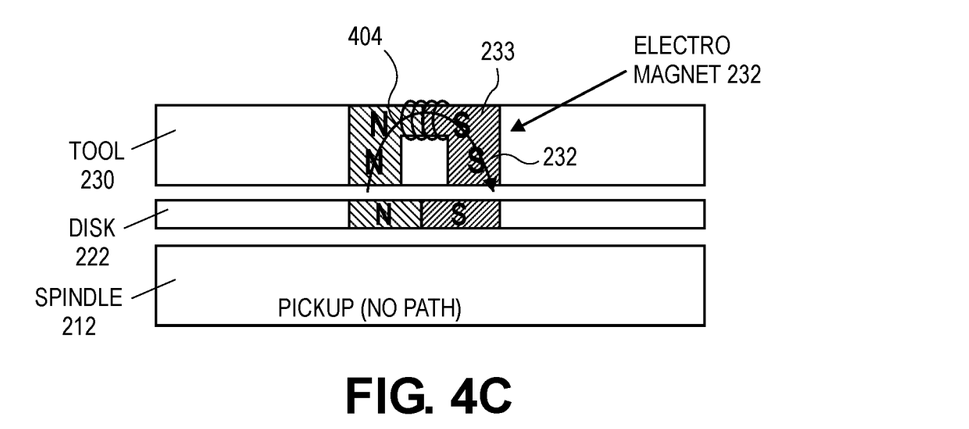

FIGS. 4A-4C are side view diagrams illustrating a disk exchange procedure, according to an embodiment. Thus, FIGS. 4A-4C generally depict operational features of the disk system 200 (FIG. 2). FIG. 4A depicts permanent magnet(s) retaining or "clamping" the disk via a ferrous flux path. For example, permanent magnet retainer 214 (FIG. 2) of motor assembly 210 (FIG. 2) retains disk medium 222 (FIG. 2) of disk assembly 220 (FIG. 2) via flux path 402 between the permanent magnets of permanent magnet retainer 214 and the ferromagnetic material 224 (FIG. 2) of disk assembly 220. FIG. 4B depicts an electromagnet(s) cancel field to bring the flux to or toward zero. For example, coils 233 (FIG. 2) of electromagnet(s) 232 (FIG. 2) of exchange tool 230 (FIG. 2) cancel the magnetic field between the permanent magnet retainer 214 and the ferromagnetic material 224 of disk assembly 220 to bring the flux path 402 (e.g., first attractive magnetic force) to or toward zero to release the disk medium 222 from retention with motor assembly 210. FIG. 4C depicts electromagnet(s) picking up the disk medium 222. For example, energized coils 233 of electromagnet(s) 232 generate flux path 404 (e.g., second attractive magnetic force) between the ferromagnetic material 224 of the disk assembly 220 and electromagnet 232 of the exchange tool 230 to remove the disk assembly 220 from the motor assembly 210.

Magnetic Configurations for Spindle, Disk, and Tool Assemblies

Figure 5A:
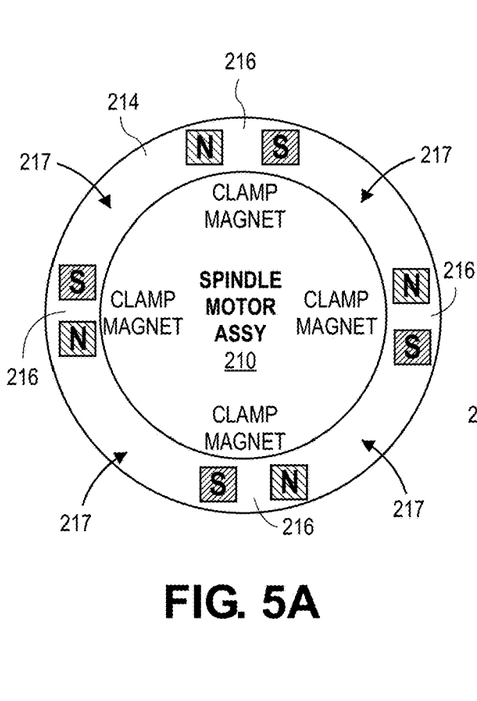
FIG. 5A is a diagram illustrating a magnetic configuration for a spindle motor of the system of FIG. 2, according to an embodiment.

FIG. 5A is a diagram illustrating a magnetic configuration for a spindle motor of the system of FIG. 2, according to an embodiment. As described, spindle motor assembly 210 comprises the spindle motor 212 and a permanent magnet retainer 214 coupled therewith. Here, retainer 214 comprises a plurality of permanent magnet poles 216 positioned annularly (e.g., in a ring form or configuration) with alternating non-magnetic areas 217, thereby defining certain flux paths. With this configuration of alternating permanent magnet poles 216 ("clamp magnets") and non-magnetic areas 217, the retainer 214 has fewer flux paths than the exchange tool 230 (FIG. 5C). One effect of such configuration is that the exchange tool 230 can cause the retainer 214 and thus the spindle motor 212 to rotate via attracting/repelling magnetic forces between magnetic poles of the electromagnets 232 of the exchange tool 230 and the magnetic poles of permanent magnet poles 216 of retainer 214, for alignment purposes as described in more detail elsewhere herein.

Figure 5B:
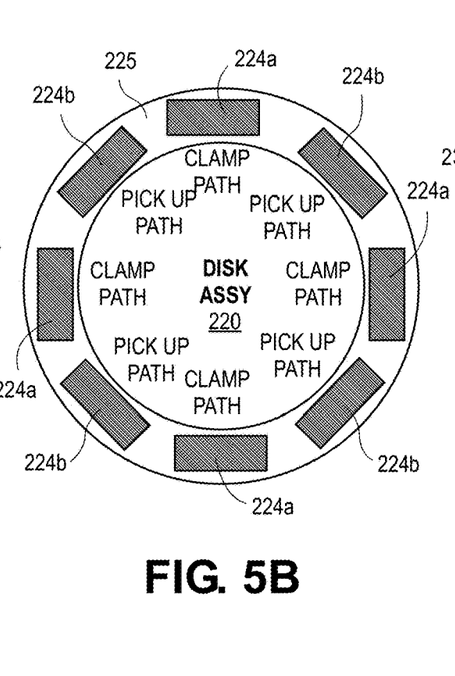
FIG. 5B is a diagram illustrating a magnetic configuration for a recording disk of the system of FIG. 2, according to an embodiment.
Figure 5C:
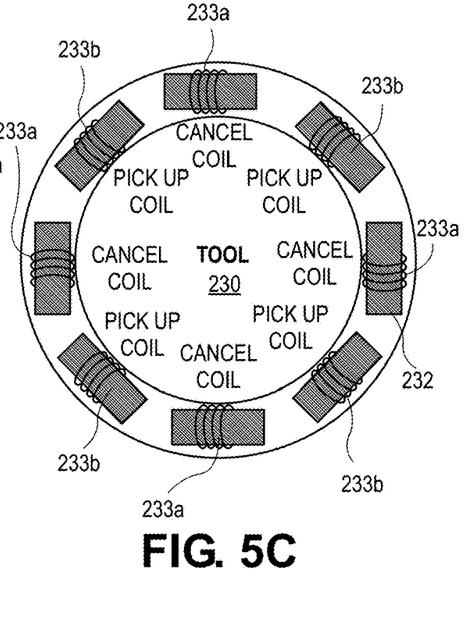
FIG. 5C is a diagram illustrating a magnetic configuration for a magnetic exchange tool of the system of FIG. 2, according to an embodiment.

FIG. 5B is a diagram illustrating a magnetic configuration for a recording disk of the system of FIG. 2, according to an embodiment. As described, disk assembly 220 comprises the disk medium 222 and the ferromagnetic material 224 coupled with the center-hole of disk medium 222, where the ferromagnetic material 224 may be embedded within or coupled to a sleeve 225 (e.g., a plastic sleeve housing), for example. As discussed and according to an embodiment the ferromagnetic material 224 may comprise alternating "clamp path" 224a positions and "pickup path" 224b positions which, in operation, coordinate with corresponding electromagnet coils 233 of the exchange tool 230 to enable installing disk assembly 220 onto (e.g., for data storage operational capability within a read-write device) and removing disk assembly 220 from motor assembly 210 (e.g., for disk exchange capability such as within a data storage library, archive, "juke box"). Alternatively, according to an embodiment the ferromagnetic material 224 of disk assembly 220 may be configured randomly, e.g., a ring of ferrous material without having specific or discrete flux paths, whereby the magnetic field in the exchange tool 230 could be modulated to attract the spindle motor 212 to the correct rotary position and then overdriven through the disk assembly 220 to retain the disk and push away the spindle motor. However, in a configuration such as depicted, having alternating "clamp path" 224a positions and "pickup path" 224b positions, each "clamp path" 224a is configured for interacting with any of the permanent magnet poles 216 (FIG. 5A, "clamp magnets") of retainer 214 of motor assembly 210 to effectuate the first attractive magnetic force for retaining disk assembly 220 on motor assembly 210 (see, e.g., top portion of FIG. 4). Further, each "pickup path" 224b is configured for interacting with corresponding electromagnets 232/coils 233 (FIG. 5C, "pickup coils 233b") of exchange tool 230 to effectuate the second attractive magnetic force for removing disk assembly 220 from motor assembly 210 (see, e.g., bottom portion of FIG. 4). Furthermore, the disk flux paths may have additional flux gap(s) to assist with releasing/cancelling flux path 404 (FIG. 4).

FIG. 5C is a diagram illustrating a magnetic configuration for a magnetic exchange tool of the system of FIG. 2, according to an embodiment. As described, exchange tool 230 comprises at least one electromagnet 232 (only one labeled here to maintain drawing clarity) and, according to an embodiment the exchange tool 230 comprises a plurality of discrete electromagnet coils 233 positioned annularly. According to an embodiment the coils 233 may comprise alternating "cancel coil" 233a positions and "pickup coil" 233b positions. In operation, each "cancel coil" 233a is configured for interacting with a corresponding "clamp magnet" permanent magnet pole 216 (FIG. 5A) of retainer 214 of motor assembly 210 to cancel or overcome the magnetic field between the permanent magnet retainer 214 of motor assembly 210 and the ferromagnetic material 224 "clamp path" 224a positions (FIG. 5B) of disk assembly 220 (first attractive magnetic force) to bring the flux path 402 (see, e.g., middle portion of FIG. 4) to or toward zero to release the disk assembly 220 from retention with motor assembly 210. Further, each "pickup coil" 233b is configured to coordinate with the ferromagnetic material 224 "pickup path" 224b positions (FIG. 5B) of disk assembly 220 to effectuate the second attractive magnetic force to hold and/or to pick up the disk assembly 220 for removing disk assembly 220 from motor assembly 210 (see, e.g., bottom portion of FIG. 4). Here, the coil strength to cancel the permanent magnet retainer 214 of the motor assembly 210 is such that it is also capable of retaining the disk assembly 220 for pickup. According to an embodiment, each of the coils 233 are wound in the same direction and are configured to use the same current level.

FIGS. 6A-6F are side view diagrams illustrating various operational configurations of spindle motor, disk, and magnetic exchange tool, according to embodiments.

Figure 6A:
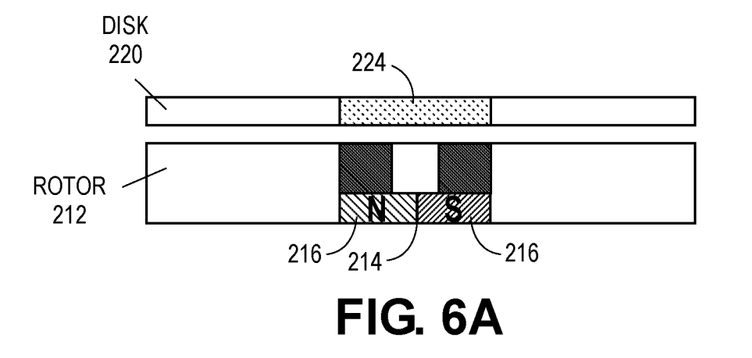
FIGS. 6A-6F are side view diagrams illustrating various operational configurations of spindle motor, disk, and magnetic exchange tool, according to embodiments.

FIG. 6A depicts a disk retainer and disk configuration, by illustrating a permanent magnet retainer 214 having north (N) and south (S) magnetic poles, coupled with or integral to the motor assembly 210. The portion of the motor assembly above the N and S poles represents high relative permeability flux paths 602 which, magnetically coupled with the poles is referred to elsewhere herein as the "horseshoe" magnet utilizing the "clamp" permanent magnet poles 216 of permanent magnet retainer 214 for providing a "clamping", retaining force to hold a disk 222 (FIG. 2) of disk assembly 220 on the spindle motor 212 (FIG. 2) hub of motor assembly 210. Positioned over the motor assembly 210 is the disk assembly 220, having a moderate permeability flux path associated with ferromagnetic material 224.

Figure 6B:
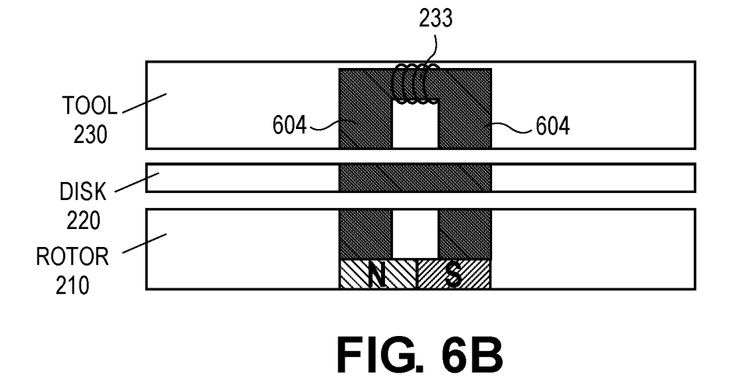

FIG. 6B depicts the exchange tool configuration, by illustrating the motor assembly 210, over which is positioned the disk assembly 220, and over which is positioned the electromagnetic exchange tool 230 having de-energized electromagnet coil(s) 233. The leg portions of the exchange tool 230 extending below the coil(s) 233 represents high relative permeability flux paths 604 which assists in the functionality of the exchange tool 230 as described throughout herein.

Figure 6C:
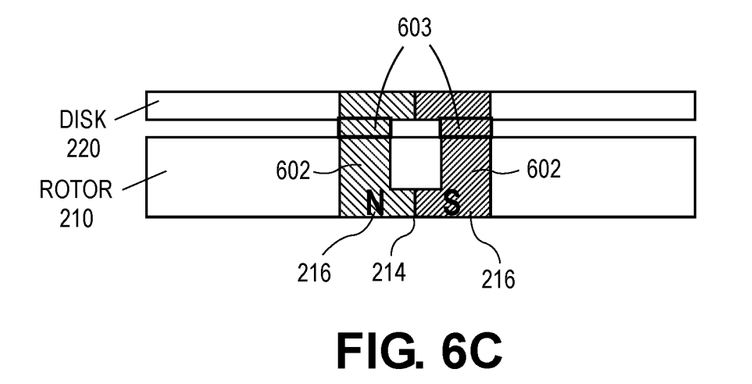

FIG. 6C depicts a disk to permanent magnet retainer (and thereby to the rotor) clamping force. Here, the high relative permeability flux paths 602 are shown magnetized N and S along with the respective underlying permanent magnet poles 216 of the retainer 214, thereby providing magnetic force 603 across the gap through disk assembly 220 moderate permeability flux path associated with ferromagnetic material 224 to "clamp", retain, hold the disk assembly 220 in place. This magnetic force 603 is proportional to the flux density across the air gap, and the flux within the ferromagnetic material 224 (FIG. 6A) of the disk assembly 220 is limited by the path area and magnet strength.

Figure 6D:
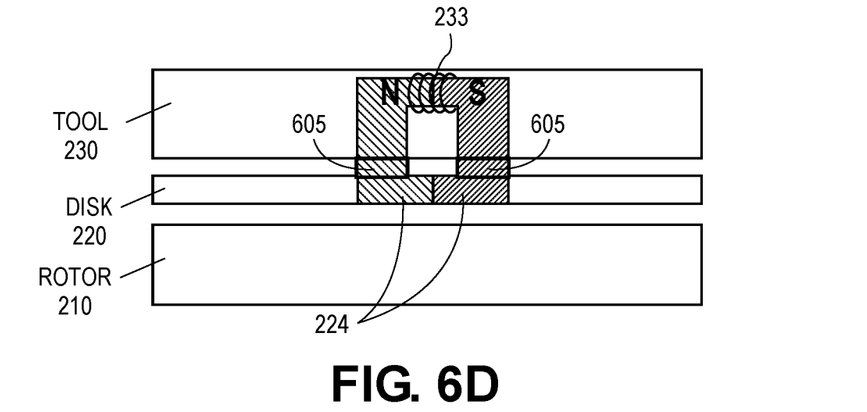

FIG. 6D depicts an exchange tool to disk clamping force, by illustrating the motor assembly 210 over which is positioned the disk assembly 220 and over which is positioned the electromagnetic exchange tool 230 having energized electromagnet coil(s) 233, thus now having north (N) and south (S) magnetic poles, thereby providing magnetic force 605 across the gap with the disk assembly 220 to hold the disk assembly 220 by the exchange tool 230. Motor assembly 210 is depicted in a state in which the gaps or non-magnetic areas 217 (FIG. 5A) between the permanent magnet poles 216 are now aligned with the ferromagnetic material 224 of disk assembly 220. Furthermore, magnetic force 605 is proportional to the flux density across the air gap.

Figure 6E:
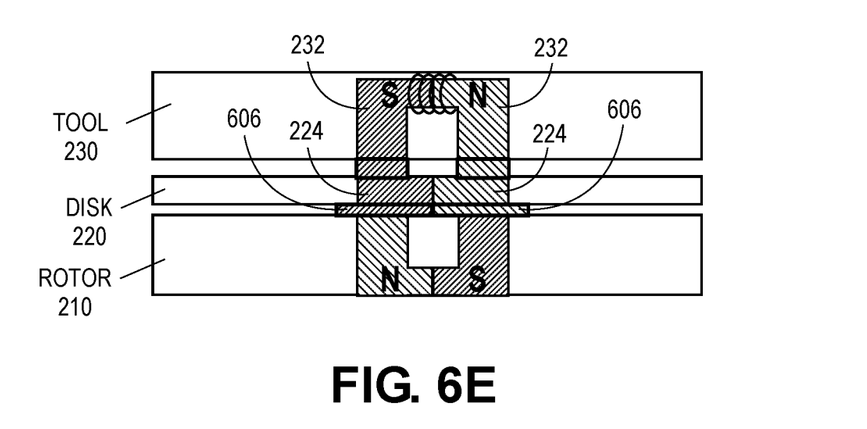

FIG. 6E depicts the exchange tool electromagnets aligning the spindle motor (i.e., the rotor) via the retainer permanent magnets. As introduced in reference to FIG. 5A, the exchange tool 230 can cause the retainer 214 and thus the spindle motor 212 to rotate via attracting/repelling magnetic forces between magnetic poles of the electromagnets 232 (see, e.g., FIG. 2) of the exchange tool 230 and the magnetic poles of permanent magnet poles 216 of retainer 214, for alignment purposes. Here, the electromagnets 232 of the exchange tool 230 are driven to push magnetic flux beyond the disk assembly 220 path, whereby the stray flux spreads across the air gap 606 between the disk assembly 220 and motor assembly 210, and whereby the horseshoe magnetics of the retainer 214 are attracted to the opposite fields of the gap 606/ferromagnetic material 224/electromagnets 232. Thus, the moderate permeability flux path associated with ferromagnetic material 224 of the disk assembly 220 effectively allows the flux to align the spindle motor 212 rotor with the N/S attraction. With reference to blocks 702 and 708 of FIGS. 7A-7B, for example, current is applied in a particular direction (e.g., in a direction opposing that used for exchange tool 230/disk assembly 220 retaining force of FIG. 6D) through certain electromagnet coils 233 of the exchange tool 230 so that the spindle motor 212 is encouraged to rotate such that the poles of the permanent magnet poles 216 of retainer 214 align with the attracting poles of the electromagnets 232 (FIG. 2) of the exchange tool 230, i.e., south poles of electromagnets 232 align with north poles of permanent magnet poles 216 and north poles of electromagnets 232 align with south poles of permanent magnet poles 216. It is preferable to know the spindle motor 212 has stopped before bringing the exchange tool 230 into contact with the disk assembly 220/motor assembly 210 to reduce generation of particles and ensure proper alignment through time delay or detection of spindle motor 212 motion. Once the spindle motor 212 has stopped rotating, the exchange tool 230 can come into contact with the disk assembly 220/motor assembly 210.

Figure 6F:
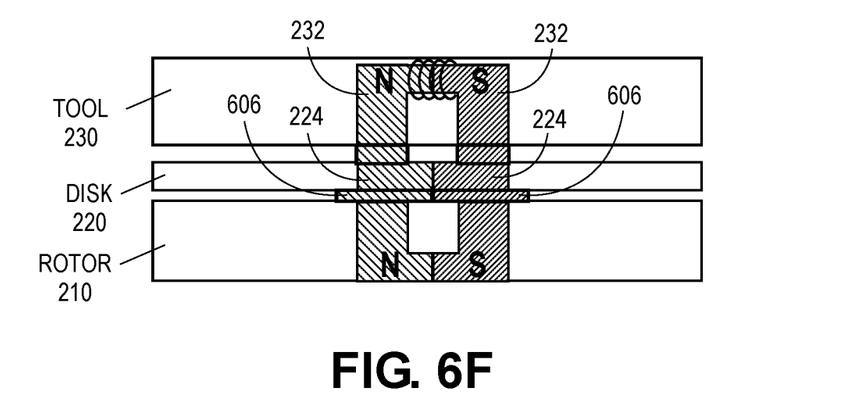

FIG. 6F depicts the exchange tool electromagnets cancelling the retainer permanent magnet force at the gap. Here again, the electromagnets 232 of the exchange tool 230 are driven (e.g., in an opposing direction to FIG. 6E) to push magnetic flux beyond the disk assembly 220 path, whereby the stray flux spreads across the air gap 606 between the disk assembly 220 and motor assembly 210, and whereby the horseshoe magnetics of the retainer 214 are now repelled (e.g., to the point of zero) by the same polarity stray fields of the gap 606/ferromagnetic material 224/electromagnets 232. Again, the moderate permeability flux path associated with ferromagnetic material 224 of the disk assembly 220 effectively allows the flux to cancel the former N/S attraction between the disk assembly 220 and motor assembly 210. With reference to block 710 of FIG. 7B, current is applied in a particular direction (e.g., in a direction opposing that used for alignment of FIG. 6E) through certain electromagnet coils 233 of the exchange tool 230 to cancel the disk-clamping attractive magnetic force between disk assembly 220 and motor assembly 210.

In view of the foregoing (e.g., FIGS. 6E-6F), the retainer 214 needs to be strong enough to hold the disk assembly 220, but weak enough to allow the exchange tool 230 to overdrive flux through it. As such, half the exchange tool coils 233 are directly holding the disk (e.g., pickup coils 233b of FIG. 5C) and the other half (e.g., cancel coils 233a of FIG. 5C) are interacting with the disk's "horseshoe" magnets. Thus, the exchange tool 230 can overdrive for alignment fields and when it is time to release, drive opposite just through the disk assembly 220 to release the disk 222 from the spindle motor 212 rotor.

Method of Operating Disk Media Retain and Exchange System

Figure 7A:
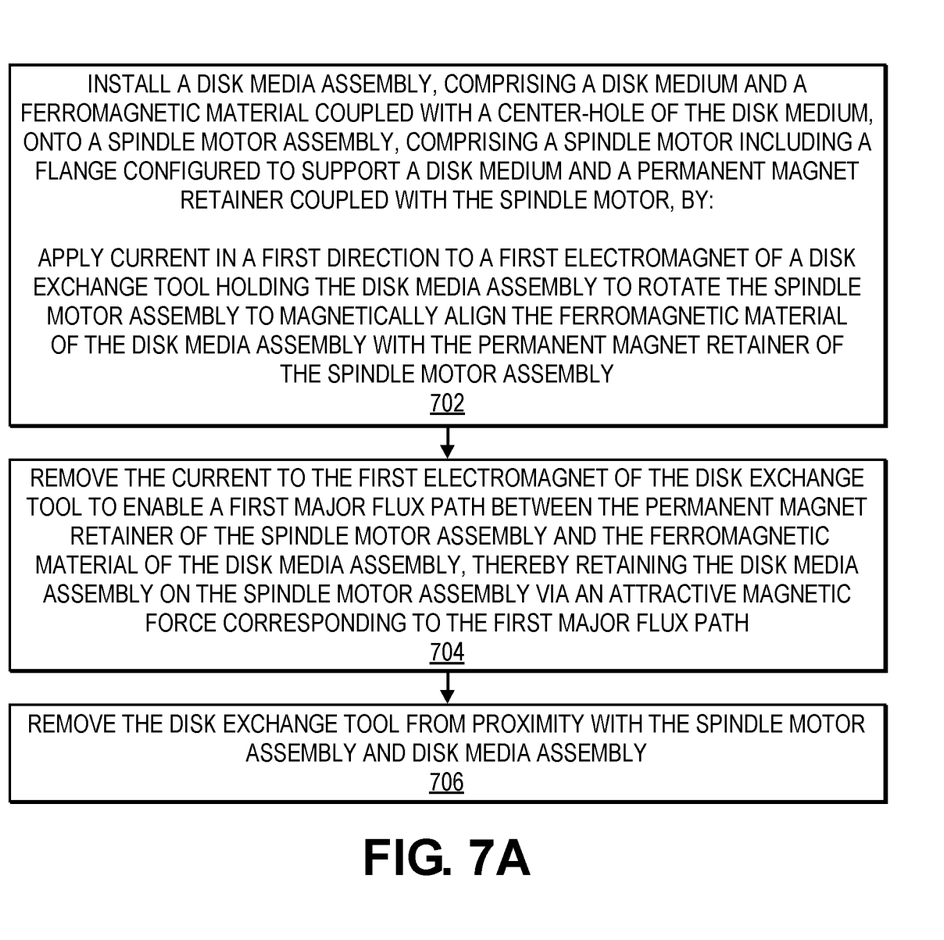
FIG. 7A is a flow diagram illustrating a method of operating a disk media retain and exchange system, according to an embodiment.
Figure 7B:
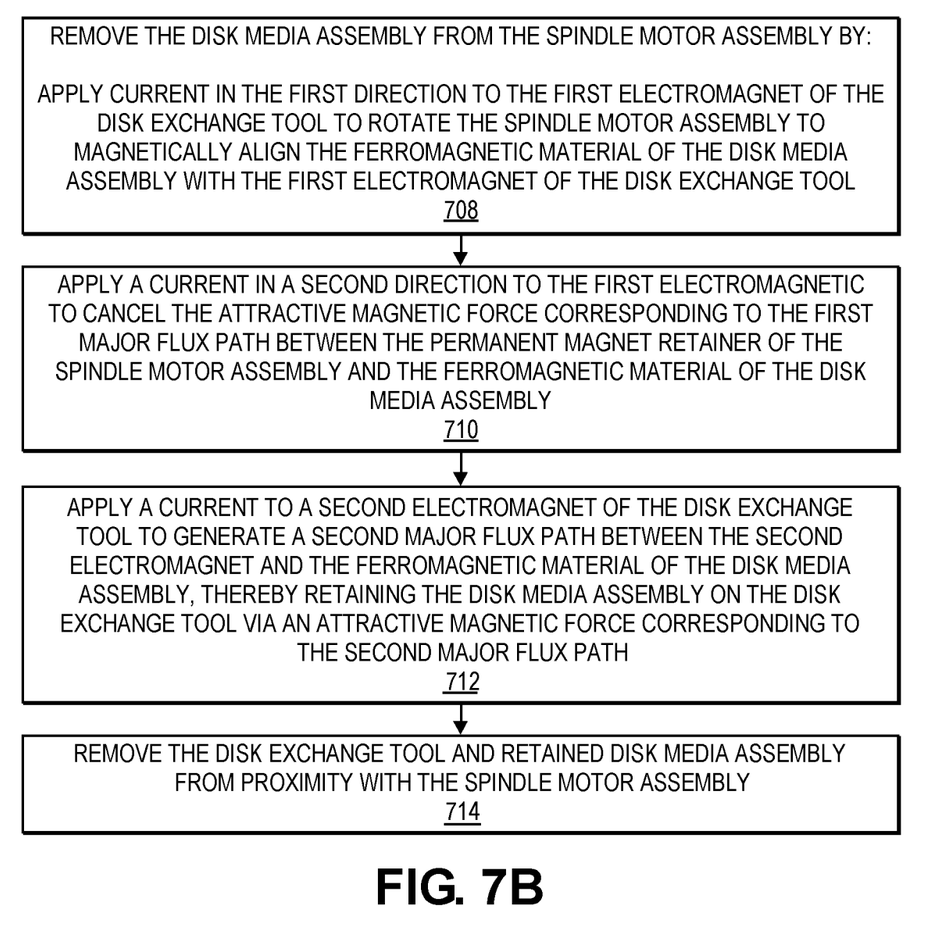
FIG. 7B is a flow diagram illustrating a method of operating a disk media retain and exchange system, according to an embodiment.

FIGS. 7A-7B are flow diagrams illustrating a method of operating a disk media retain and exchange system, both according to embodiments. Example uses include operating disk retain and exchange system 200 (FIG. 2) associated with, corresponding to a read-write device (e.g., a modified, modular, or deconstructed form of a conventional hard disk drive) in a data storage system such as a data storage library, data archive, rack-mountable data storage juke box, and the like.

With reference first to FIG. 7A, at block 702, install a disk media assembly, comprising a disk medium and a ferromagnetic material coupled with a center-hole of the disk medium, onto a spindle motor assembly, comprising a spindle motor including a flange configured to support a disk medium and a permanent magnet retainer coupled with the spindle motor, by applying current in a first direction to a first electromagnet of a disk exchange tool holding the disk media assembly to rotate the spindle motor assembly to magnetically align the ferromagnetic material of the disk media assembly with the permanent magnet retainer of the spindle motor assembly. For example, the "clamp path" 224a positions (FIG. 5B) of disk assembly 220 (FIG. 2) need to be aligned with any of the permanent magnet poles 216

(FIG. 5A, "clamp magnets") of retainer 214 (FIG. 2) of motor assembly 210 (FIG. 2) to effectuate the first attractive magnetic force for retaining disk assembly 220 on motor assembly 210 (FIG. 2; see also, top portion of FIG. 4). Hence, current is applied in a particular direction through certain electromagnet coils 233 (FIG. 5C) of the exchange tool 230 (FIG. 2) so that the spindle motor 212 (FIG. 2) is encouraged to rotate such that the poles of the permanent magnet poles 216 of retainer 214 align with the attracting poles of the electromagnets 232 (FIG. 2) of the exchange tool, i.e., south poles of electromagnets 232 align with north poles of permanent magnet poles 216 and north poles of electromagnets 232 align with south poles of permanent magnet poles 216. One approach to the foregoing is to apply a reverse current (relative to disk removal direction) through the "pickup coils" 233b (FIG. 5C) of the exchange tool 230 in order to position the electromagnet 232 poles appropriately to cause the spindle motor 212 rotation for alignment with the "clamp path" 224a positions of the ferromagnetic material 224 (FIG. 2) of disk assembly 220.

In regards to completing the alignment of the spindle motor 212 (i.e., rotor movement has settled and is stable), the exchange tool 230 stray fields to the motor assembly 210 may be trusted to complete the alignment, or a spindle motor driver may align the rotor to a position within one of the plurality of electrical cycles (as long as the exchange tool 230 matches the spindle motor cycle positioning), such that disk install and removal are facilitated. Furthermore and according to embodiments, back electro-motive force (BEMF) detection may be implemented on one or more coils to determine, confirm, sense when alignment is settled and complete, or a form of inductive sensing may be implemented to understand when the alignment (see, generally, alignment sensing 240 of FIG. 2) is stable (e.g., no rotational jitter or vibration). For example, BEMF could be measured (i.e., sensed) from the spindle motor 212 coils or extracted from the exchange tool 230 coils 233 using direct measurement, or IR (current times resistance) subtraction for driven coils, i.e., a method to measure current times resistance to create a value of voltage to subtract from the terminal voltage of a motor, where the remaining voltage is BEMF or speed. Note that a secondary term of motor inductance and change in current may also produce a voltage (L*di/dt) but this can settle out of measurements or be compensated for if necessary. For another example, an optical sensing subsystem may be employed to understand when the rotor has settled, such as with reflective LED(s), photodiode, camera, and the like. Once alignment is settled (e.g., reached a steady state with no rotational jitter or vibration), the exchange tool 230/disk assembly 220 may be brought into contact with the motor assembly 210.

At block 704, remove the current to the first electromagnet of the disk exchange tool to enable a first major flux path between the permanent magnet retainer of the spindle motor assembly and the ferromagnetic material of the disk media assembly, thereby retaining the disk media assembly on the spindle motor assembly via an attractive magnetic force corresponding to the first major flux path. For example, the electromagnet coils 233 of the exchange tool 230 are deenergized or set to a relatively low bias such that no more than a minor (relatively weak) flux path will go through the exchange tool 230 and a major (relatively strong) flux path will go through the disk assembly 220, thereby enabling the permanent magnet poles 216 of the motor assembly 210 to effectuate the first attractive magnetic force with the "clamp path" 224a positions of the ferromagnetic material 224 of disk assembly 220 to sufficiently operationally retain, hold, clamp the disk assembly 220 to the flange 213 (FIG. 2) of the spindle motor 212.

At block 706, remove the disk exchange tool from proximity with the spindle motor assembly and disk media assembly. For example, once the first attractive magnetic force is established between the ferromagnetic material 224 and the permanent magnet poles 216, the exchange tool 230 can be deenergized and moved away from the assembly of the motor assembly 210 and the disk assembly 220, and the disk installation procedure is considered completed.

With reference now to FIG. 7B, at block 708, remove the disk media assembly from the spindle motor assembly by applying current in the first direction to the first electromagnet of the disk exchange tool to rotate the spindle motor assembly to magnetically align the ferromagnetic material of the disk media assembly with the first electromagnet of the disk exchange tool. For example, the "cancel coils" 233a (FIG. 5C) of the exchange tool 230 (FIG. 2) need to be aligned with the "clamp path" 224a (FIG. 5B) positions of disk assembly 220 (FIG. 2) to sufficiently cancel, repel, override, release the first attractive magnetic force retaining disk assembly 220 on motor assembly 210 (FIG. 2), and the "pickup path" 224b positions (FIG. 5B) of disk assembly 220 need to be aligned with "pickup coils" 233b (FIG. 5C) of the exchange tool 230 for the exchange tool 230 to hold the disk assembly 220 for removal from motor assembly 210. Hence, similarly to block 702 of FIG. 7A, current is applied in a particular direction through certain electromagnet coils 233 (FIG. 5C) of the exchange tool 230 so that the spindle motor 212 (FIG. 2) is encouraged to rotate such that the poles of the permanent magnet poles 216 of retainer 214 align with the attracting poles of the electromagnets 232 (FIG. 2) of the exchange tool 230, i.e., south poles of electromagnets 232 align with north poles of permanent magnet poles 216 and north poles of electromagnets 232 align with south poles of permanent magnet poles 216. Here again, one approach to the foregoing is to apply a reverse current (relative to disk removal direction) through the "pickup coils" 233b of the exchange tool 230 in order to position the electromagnet 232 poles appropriately to cause the spindle motor 212 rotation. Thus, at this point the "cancel coils" 233a of the exchange tool 230 are aligned with the "clamp path" 224a positions of disk assembly 220 and the "pickup coils" 233b of the exchange tool 230 are aligned with the "pickup path" 224b positions of disk assembly 220. Here again, once alignment is settled, the exchange tool 230 may be brought into contact with the disk assembly 220/motor assembly 210.

At block 710, apply a current in a second direction to the first electromagnet to cancel the attractive magnetic force corresponding to the first major flux path between the permanent magnet retainer of the spindle motor assembly and the ferromagnetic material of the disk media assembly. For example, current is applied to the "cancel coils" 233a of the exchange tool 230 to cancel the disk-clamping first attractive magnetic force between disk assembly 220 and motor assembly 210.

At block 712, apply a current to a second electromagnet of the disk exchange tool to generate a second major flux path between the second electromagnet and the ferromagnetic material of the disk media assembly, thereby retaining the disk media assembly on the disk exchange tool via an attractive magnetic force corresponding to the second major flux path. For example, current is applied to the "pickup coils" 233b of the exchange tool 230 to attract the pickup magnetic paths to generate the second attractive magnetic force between the exchange tool 230 and the disk assembly 220. Because the "cancel coils" 233a of the exchange tool 230 are aligned with the "clamp path" 224a positions of disk assembly 220 and the "pickup coils" 233b of the exchange tool 230 are aligned with the "pickup path" 224b positions of disk assembly 220, energizing all the electromagnet coils 233 applies current through the "cancel coils" 233a and applies current in a disk removal direction (i.e., a "second direction" opposing the "first direction") through the "pickup coils" 233b.

At block 714, remove the disk exchange tool and retained disk media assembly from proximity with the spindle motor assembly. For example, once the second attractive magnetic force is established between the ferromagnetic material 224 and the electromagnets 232 and the disk assembly 220 is thereby retained by the exchange tool 230, the exchange tool 230 can be moved away from the motor assembly 210, moved to a disk storage location and deenergized to deposit the disk in storage and the disk removal procedure is completed. The exchange tool 230 could then return to a storage location, pick up a disk by energizing, and moving back to the install process starting at block 702.

Consideration is given to constructing the magnetic retainer ring (e.g., retainer 214) with a constant permeability which facilitates the retaining and release actions while eliminating the need for aligning the disk assembly 220 to the exchange tool 230 or to the motor assembly 210 hub. However, it would still be necessary to align the exchange tool 230 to the motor assembly 210 hub, such as by aligning the spindle motor 212 to an orientation that is compatible with a matching number of electromagnets 232 on the exchange tool 230.

With respect to each "alignment phase", i.e., alignment between exchange tool 230/disk assembly 220 and motor assembly 210 for disk install (see block 702 of FIG. 7A) and alignment between the exchange tool 230 and the disk assembly 220/motor assembly 210 for disk removal (see block 708 of FIG. 7B), it is preferable that the alignment is stable (e.g., no rotational jitter or vibration) before positioning the three magnetic components in contact because when the components are motionless there is less friction and therefore less potential for particle generation. Reference is made to sensing mechanisms described elsewhere herein for determining when magnetic fields are sufficiently cancelled for a stable, steady state of alignment.

The foregoing approaches enable reliable low-stress disk swapping, when magnetic fields and mechanical motion are in a stable, steady state of alignment, utilizing magnets instead of screws or hard clamps to retain the disk media to the spindle motor. Hence, there is less likelihood of generating particulate contamination and minimal stress on the mechanisms. Furthermore, these approaches are considered relatively low-power because power is only needed when the exchange tool is picking up and moving the disk media, because in resting and operating states the disks are retained by permanent magnets. Still further, foregoing permanent magnets in each disk avoids that additional cost per disk unit, such as in a large-scale data storage library like a data storage "juke box". Further cost and strength improvements may be possible if the brushless DC spindle motor magnets were coupled to the clamping surface through a ferromagnetic path forming a dual purpose for magnets already required. It is possible to couple all magnets of the brushless DC spindle motor to the clamping surface to aid in symmetry of the motor design, requiring carefully driving the cancel current to a level that provides significant flux through the exchange tool to disk gap for sufficient pickup force and the stray flux beyond the disk assembly cancels the spindle motor attractive force in the gap between the disk assembly and spindle motor, allowing easy removal of the disk.

Physical Description of an Illustrative Operating Context

Embodiments may be implemented in the context of digital data storage devices (DSDs) such as hard disk drive (HDDs) or modified HDDs. Thus, in accordance with an embodiment, a plan view illustrating a conventional HDD 100 is shown in FIG. 1 to aid in describing how a conventional HDD typically operates.

Figure 1:
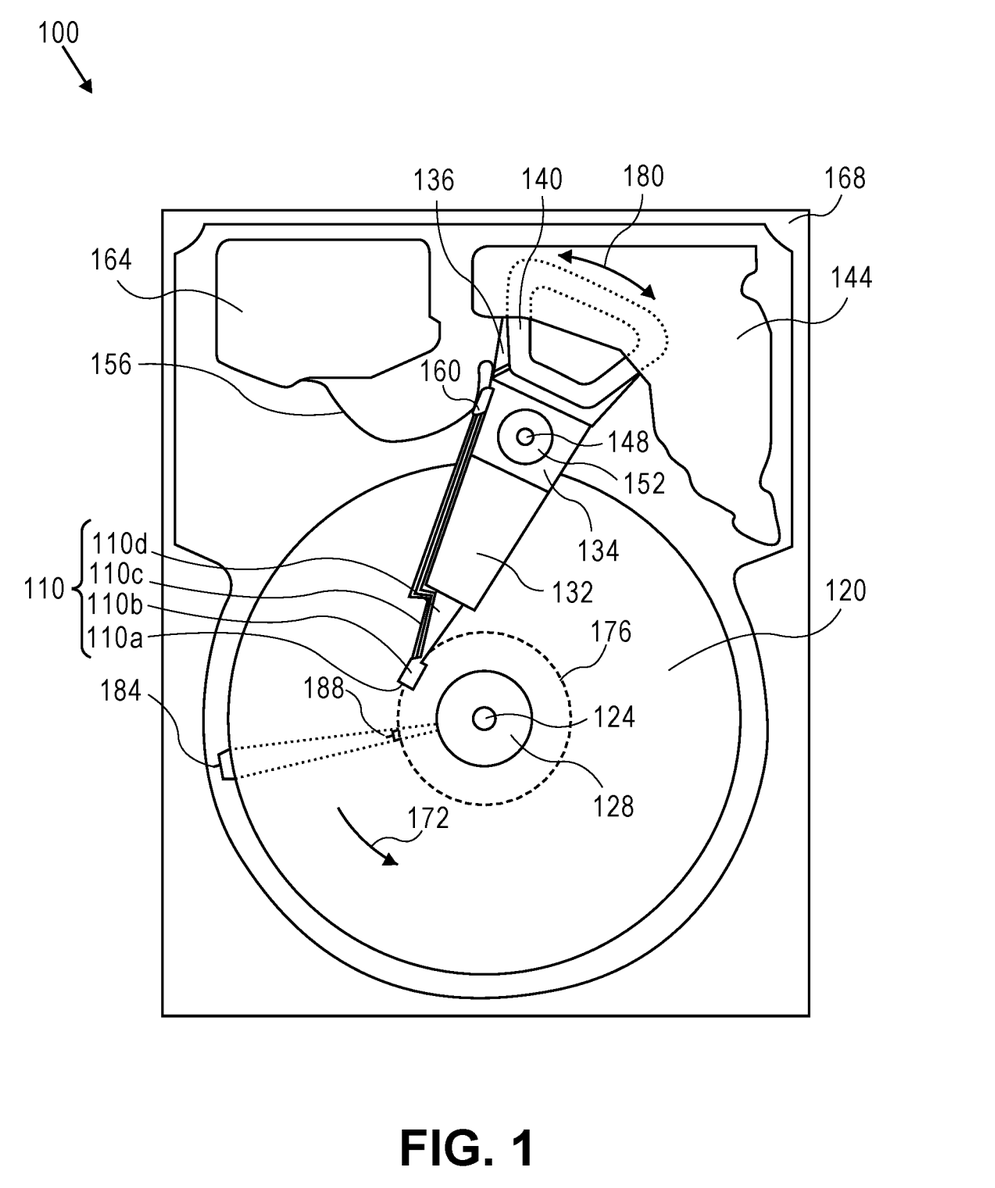
FIG. 1 is a plan view illustrating a hard disk drive (HDD), according to an embodiment.

FIG. 1 illustrates the functional arrangement of components of the HDD 100 including a slider 110b that includes a magnetic read-write head 110a. Collectively, slider 110b and head 110a may be referred to as a head slider. The HDD 100 includes at least one head gimbal assembly (HGA) 110 including the head slider, a lead suspension 110c attached to the head slider typically via a flexure, and a load beam 110d attached to the lead suspension 110c. The HDD 100 also includes at least one recording medium 120 rotatably mounted on a spindle 124 and a drive motor (not visible) attached to the spindle 124 for rotating the medium 120. The read-write head 110a, which may also be referred to as a transducer, includes a write element and a read element for respectively writing and reading information stored on the medium 120 of the HDD 100. The medium 120 or a plurality of disk media may be affixed to the spindle 124 with a disk clamp 128. According to embodiments described herein, disk media are not permanently affixed to a spindle (such as spindle 124) but are temporarily/removably mounted onto a spindle and magnetically clamped or held thereon, for facilitating read/write operations.

The HDD 100 further includes an arm 132 attached to the HGA 110, a carriage 134, a voice-coil motor (VCM) that includes an armature 136 including a voice coil 140 attached to the carriage 134 and a stator 144 including a voice-coil magnet (not visible). The armature 136 of the VCM is attached to the carriage 134 and is configured to move the arm 132 and the HGA 110 to access portions of the medium 120, all collectively mounted on a pivot shaft 148 with an interposed pivot bearing assembly 152. In the case of an HDD having multiple disks, the carriage 134 may be referred to as an "E-block," or comb, because the carriage is arranged to carry a ganged array of arms that gives it the appearance of a comb.

An assembly comprising a head gimbal assembly (e.g., HGA 110) including a flexure to which the head slider is coupled, an actuator arm (e.g., arm 132) and/or load beam to which the flexure is coupled, and an actuator (e.g., the VCM) to which the actuator arm is coupled, may be collectively referred to as a head-stack assembly (HSA). An HSA may, however, include more or fewer components than those described. For example, an HSA may refer to an assembly that further includes electrical interconnection components. Generally, an HSA is the assembly configured to move the head slider to access portions of the medium 120 for read and write operations.

With further reference to FIG. 1, electrical signals (e.g., current to the voice coil 140 of the VCM) comprising a write signal to and a read signal from the head 110a, are transmitted by a flexible cable assembly (FCA) 156 (or "flex cable", or "flexible printed circuit" (FPC)). Interconnection between the flex cable 156 and the head 110a may include an arm-electronics (AE) module 160, which may have an on-board pre-amplifier for the read signal, as well as other read-channel and write-channel electronic components. The AE module 160 may be attached to the carriage 134 as shown. The flex cable 156 may be coupled to an electrical-connector block 164, which provides electrical communication, in some configurations, through an electrical feed-through provided by an HDD housing 168. The HDD housing 168 (or "enclosure base" or "baseplate" or simply "base"), in conjunction with an HDD cover, provides a semi-sealed (or hermetically sealed, in some configurations) protective enclosure for the information storage components of the HDD 100.

Other electronic components, including a disk controller and servo electronics including a digital-signal processor (DSP), provide electrical signals to the drive motor, the voice coil 140 of the VCM and the head 110a of the HGA 110. The electrical signal provided to the drive motor enables the drive motor to spin providing a torque to the spindle 124 which is in turn transmitted to the medium 120 that is affixed to the spindle 124. As a result, the medium 120 spins in a direction 172. The spinning medium 120 creates a cushion of air that acts as an air-bearing on which the air-bearing surface (ABS) of the slider 110b rides so that the slider 110b flies above the surface of the medium 120 without making contact with a thin magnetic-recording layer in which information is recorded. Similarly in an HDD in which a lighter-than-air gas is utilized, such as helium for a non-limiting example, the spinning medium 120 creates a cushion of gas that acts as a gas or fluid bearing on which the slider 110b rides.

The electrical signal provided to the voice coil 140 of the VCM enables the head 110a of the HGA 110 to access a track 176 on which information is recorded. Thus, the armature 136 of the VCM swings through an arc 180, which enables the head 110a of the HGA 110 to access various tracks on the medium 120. Information is stored on the medium 120 in a plurality of radially nested tracks arranged in sectors on the medium 120, such as sector 184. Correspondingly, each track is composed of a plurality of sectored track portions (or "track sector") such as sectored track portion 188. Each sectored track portion 188 may include recorded information, and a header containing error correction code information and a servo-burst-signal pattern, such as an ABCD-servo-burst-signal pattern, which is information that identifies the track 176. In accessing the track 176, the read element of the head 110a of the HGA 110 reads the servo-burst-signal pattern, which provides a position-error-signal (PES) to the servo electronics, which controls the electrical signal provided to the voice coil 140 of the VCM, thereby enabling the head 110a to follow the track 176. Upon finding the track 176 and identifying a particular sectored track portion 188, the head 110a either reads information from the track 176 or writes information to the track 176 depending on instructions received by the disk controller from an external agent, for example, a microprocessor of a computer system.

An HDD's electronic architecture comprises numerous electronic components for performing their respective functions for operation of an HDD, such as a hard disk controller ("HDC"), an interface controller, an arm electronics module, a data channel, a motor driver, a servo processor, buffer memory, etc. Two or more of such components may be combined on a single integrated circuit board referred to as a "system on a chip" ("SOC"). Several, if not all, of such electronic components are typically arranged on a printed circuit board that is coupled to the bottom side of an HDD, such as to HDD housing 168.

References herein to a hard disk drive, such as HDD 100 illustrated and described in reference to FIG. 1, may encompass an information storage device that is at times referred to as a "hybrid drive". A hybrid drive refers generally to a storage device having functionality of both a traditional HDD (see, e.g., HDD 100) combined with solid-state storage device (SSD) using non-volatile memory, such as flash or other solid-state (e.g., integrated circuits) memory, which is electrically erasable and programmable. As operation, management and control of the different types of storage media typically differ, the solid-state portion of a hybrid drive may include its own corresponding controller functionality, which may be integrated into a single controller along with the HDD functionality. A hybrid drive may be architected and configured to operate and to utilize the solid-state portion in a number of ways, such as, for non-limiting examples, by using the solid-state memory as cache memory, for storing frequently-accessed data, for storing I/O intensive data, and the like. Further, a hybrid drive may be architected and configured essentially as two storage devices in a single enclosure, i.e., a traditional HDD and an SSD, with either one or multiple interfaces for host connection.

Extensions and Alternatives

In the foregoing description, embodiments of the invention have been described with reference to numerous specific details that may vary from implementation to implementation. Therefore, various modifications and changes may be made thereto without departing from the broader spirit and scope of the embodiments. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

In addition, in this description certain process steps may be set forth in a particular order, and alphabetic and alpha-numeric labels may be used to identify certain steps. Unless specifically stated in the description, embodiments are not necessarily limited to any particular order of carrying out such steps. In particular, the labels are used merely for convenient identification of steps, and are not intended to specify or require a particular order of carrying out such steps.

What is claimed is:

1. A disk media retain and exchange system configured to accept a disk media assembly comprising a disk medium and a ferromagnetic material coupled with a center-hole of the disk medium, the disk media retain and exchange system comprising:
   a spindle motor assembly comprising:
      a spindle motor including a flange configured to support a disk medium, and
      a permanent magnet retainer coupled with the spindle motor;
   wherein the disk media retain and exchange system is configured to retain the disk medium on the spindle motor assembly by a first attractive magnetic force between the ferromagnetic material of the disk media assembly and the permanent magnet retainer of the spindle motor assembly; and a disk exchange tool comprising a plurality of discrete electromagnet coils positioned around an annular housing, the disk exchange tool being configured such that energization of the electromagnet coils in close proximity to the disk media assembly overcomes the first attractive magnetic force to release the disk media assembly from retention with the spindle motor assembly and generates a second attractive magnetic force between the ferromagnetic material of the disk media assembly and at least one electromagnet of the disk exchange tool to remove the disk media assembly from the spindle motor assembly.

2. The disk media retain and exchange system of claim 1, wherein:

the plurality of electromagnet coils of the disk exchange tool comprises alternating cancel coils and pickup coils; and the first attractive magnetic force is overcome via the cancel coils, and the second attractive magnetic force is generated via the pickup coils.

3. The disk media retain and exchange system of claim 1, wherein:

the plurality of electromagnet coils of the disk exchange tool comprises alternating cancel coils and pickup coils; and the ferromagnetic material of the disk media assembly comprises a plurality of positions of the ferromagnetic material corresponding to respective positions of the plurality of electromagnet coils.

4. The disk media retain and exchange system of claim 3, wherein:

the permanent magnet retainer of the spindle motor assembly comprises a plurality of permanent magnets positioned annularly with alternating nonmagnetic areas;

the plurality of positions of the ferromagnetic material of the disk media assembly comprises alternating clamp path positions and pickup path positions; and the clamp path positions effectuate the first attractive magnetic force with the permanent magnets of the spindle motor assembly, and the pickup path positions effectuate the second magnetic force with the pickup coils of the disk exchange tool.

5. The disk media retain and exchange system of claim 4, wherein:

the first attractive magnetic force is overcome via the cancel coils of the disk exchange tool.

6. The disk media retain and exchange system of claim 1, wherein the spindle motor further includes extended back iron portions configured to extend coincident with magnetic poles of the permanent magnet retainer.

7. A magnetic read-write device comprising the disk media retain and exchange system of claim 1.

8. A method of operating a disk media retain and exchange system for a read-write device, the method comprising:

installing a disk media assembly, comprising a disk medium and a ferromagnetic material coupled with a center-hole of the disk medium, onto a spindle motor assembly, comprising a spindle motor including a flange configured to support a disk medium and a permanent magnet retainer coupled with the spindle motor, by:

applying current in a first direction to a first electromagnet of a disk exchange tool holding the disk media assembly to rotate the spindle motor assembly to magnetically align the ferromagnetic material of the disk media assembly with the permanent magnet retainer of the spindle motor assembly;

removing the current to the first electromagnet of the disk exchange tool to enable a first major flux path between the permanent magnet retainer of the spindle motor assembly and the ferromagnetic material of the disk media assembly, thereby retaining the disk media assembly on the spindle motor assembly via an attractive magnetic force corresponding to the first major flux path; and removing the disk exchange tool from proximity with the spindle motor assembly and disk media assembly.

9. The method of claim 8, wherein:

the permanent magnet retainer of the spindle motor assembly comprises a plurality of permanent magnets positioned annularly with alternating nonmagnetic areas.

10. The method of claim 8, wherein:

the disk exchange tool comprises a plurality of alternating cancel coils and pickup coils positioned around an annular housing; and the ferromagnetic material of the disk media assembly comprises a plurality of positions of the ferromagnetic material corresponding to respective positions of the plurality of coils of the disk exchange tool.

11. The method of claim 8, further comprising:

after applying the current in the first direction to magnetically align the ferromagnetic material of the disk media assembly with the permanent magnet retainer of the spindle motor assembly and prior to the disk exchange tool holding the disk media assembly contacting the spindle motor assembly and prior to removing the current, determining that the aligning is complete.

12. The method of claim 8, wherein the disk exchange tool comprises a plurality of alternating cancel coils and pickup coils positioned around an annular housing, the method further comprising:

removing the disk media assembly from the spindle motor assembly by:

applying current in the first direction to the first electromagnet of the disk exchange tool to rotate the spindle motor assembly to magnetically align the ferromagnetic material of the disk media assembly and the spindle motor assembly with the disk exchange tool;

applying a current in a second direction to the first electromagnet to cancel the attractive magnetic force corresponding to the first major flux path between the permanent magnet retainer of the spindle motor assembly and the ferromagnetic material of the disk media assembly;

applying a current to a second electromagnet of the disk exchange tool to enable a second major flux path between the second electromagnet and the ferromagnetic material of the disk media assembly, thereby retaining the disk media assembly on the disk exchange tool via an attractive magnetic force corresponding to the second major flux path; and removing the disk exchange tool and retained disk media assembly from proximity with the spindle motor assembly.

13. The method of claim 12, wherein:
applying current in the first direction to the first electromagnet comprises applying a reverse current to the plurality of pickup coils;
applying current to the second electromagnet comprises applying current to the plurality of cancel coils; and
removing the disk exchange tool and retained disk media assembly includes applying current to the first electromagnet in a second direction opposing the first direction.

14. The method of claim 12, further comprising:
after applying the current in a first direction to magnetically align the ferromagnetic material of the disk media assembly and spindle motor assembly with the first electromagnet of the disk exchange tool and prior to applying a current in a second direction to the first electromagnet to cancel the attractive magnetic force, and prior to the disk exchange tool contacting the disk media assembly being held by the spindle motor assembly, determining that the aligning is complete.

15. A disk media system comprising:
a spindle motor assembly comprising:
   a spindle motor including a flange configured to support a disk medium, and
   a permanent magnet retainer coupled with the spindle motor;
a disk media assembly comprising:
   a disk medium, and
   a ferromagnetic material coupled with a center-hole of the disk medium;
means for magnetically aligning the ferromagnetic material of the disk media assembly with the permanent magnet retainer of the spindle motor assembly;
means for sensing that the magnetically aligning is complete; and
means for enabling a first major flux path between the permanent magnet retainer of the spindle motor assembly and the ferromagnetic material of the disk media assembly such that the disk media assembly is magnetically retained onto the spindle motor assembly via an attractive magnetic force corresponding to the first major flux path.

16. The disk media system of claim 15, further comprising:
means for generating a second major flux path with the ferromagnetic material of the disk media assembly to hold the disk media assembly via an attractive magnetic force corresponding to the second major flux path.

17. The disk media system of claim 16, wherein the ferromagnetic material of the disk media assembly comprises a ring of ferrous material without discrete flux paths.

* * * * *